May 10, 1960  C. DOYER  2,935,880
END ROLLER FOR A TRANSPORTING BELT

Filed Feb. 3, 1958  2 Sheets-Sheet 1

INVENTOR:
CORNELIS DOYER

By

*Karl F. Ross*

AGENT

INVENTOR:
CORNELIS DOYER
By
AGENT

2,935,880
END ROLLER FOR A TRANSPORTING BELT

Cornelis Doyer, Bussum, Netherlands

Application February 3, 1958, Serial No. 712,907

9 Claims. (Cl. 74—241)

This invention relates to an end roller for endless belts and the principal object of the invention is to provide an end roller which automatically trains the belt back into line when the belt tends to run to one of the sides.

To obtain this object, my end roller comprises an inner rotatable member and a plurality of segmentally shaped outer members which are curved in a plane transverse to the axis of the inner member and are pivotally mounted on the latter with small mutual separation so as to be capable of swinging in respective axial planes, said outer members together forming a substantially cylindrical supporting surface for the endless belt. To maintain these outer members in their normal positions generally parallel to the axis of the inner member, I may provide resilient means which may form part of the support for those outer members or may be positioned on the inner member alongside the pivotal mounting means.

If the belt has run to some extent to one of the sides, the supporting surface formed by the outer members of my end roller will substantially take a more or less conical form which causes the belt to move in the opposite axial direction since a belt always tends to shift to that part of a roller which has the greatest diameter.

Preferably transmission means are provided for communicating a swinging movement of one of said outer members to the other ones. Thus, the outer members maintain their position relatively to the axis of rotation while not being in contact with the belt.

For a better understanding of my invention reference is made to the accompanying drawing which shows two embodiments of this invention. In the drawing.

Figure 1:
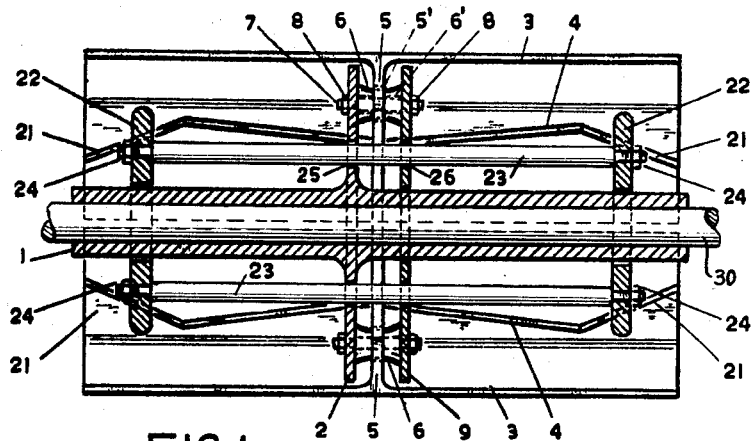
Fig. 1 is a longitudinal section through the first embodiment, taken on line I—I of Fig. 2.
Figure 2:
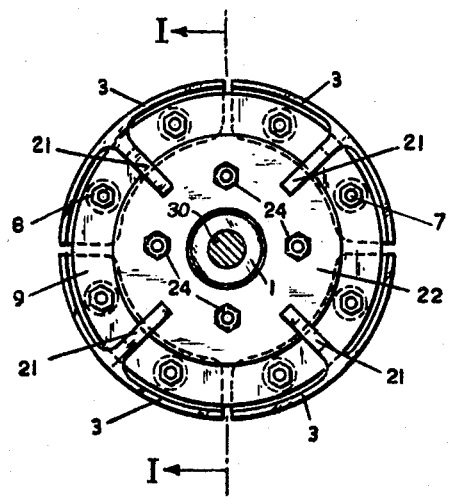
Fig. 2 shows this embodiment in an end view.

Referring to Figs. 1 and 2, the end roller has a hub, a cylindrical inner member 1 rotatably mounted on an inner rod 30. The hub carries a flange 2 which is perpendicular to the axis of rotation. The belt-supporting outer surface is formed by a number of segmental outer members 3 having longitudinal inner stiffening ribs 4 and transverse fins or flanges 5 extending inwards perpendicularly to the axis of rotation. Rubber bodies 6, each comprising two frusto-conical parts so as to taper from their extremities toward a reduced midsection, are thrust into openings 5' of the flanges 5, the diameter of which substantially corresponds to the diameter of the extremities of these bodies. The elastic supporting bodies 6 are provided with bores 6' traversed by bolts 7. By means of these bolts 7 and nuts 8 the rubber bodies carrying the members 3 are clamped between the flange 2 and an annular disc 9 which rigidly interconnects their free ends.

Each outer member 3 is anchored to a pair of symmetrically positioned, angularly spaced rubber bodies 6, all of these bodies lying adjacent the periphery of mounting flange 2 in a circular array within the same plane perpendicular to the axis of rotation, at equal distances from said axis, so that the members 3 are capable of carrying out a swinging movement in an axial plane.

At its ends each stiffening rib 4 is provided with sloping cam faces 21 approaching the axis of rotation. An axially movable rigid unit comprising two plates 22 encircling the hub 1, interconnected by means of rods 23 and nuts 24 screwed on the ends of said rods, cooperates with the faces 21 of the stiffening ribs 4 so that a swinging movement of one of the outer members 3 causes the other outer members to carry out the same swinging movement. The flange 2 and the disc 9 are provided with openings 25 and 26, respectively, permitting the axial movement of the rods 23 carrying the plates 22.

Figure 3:
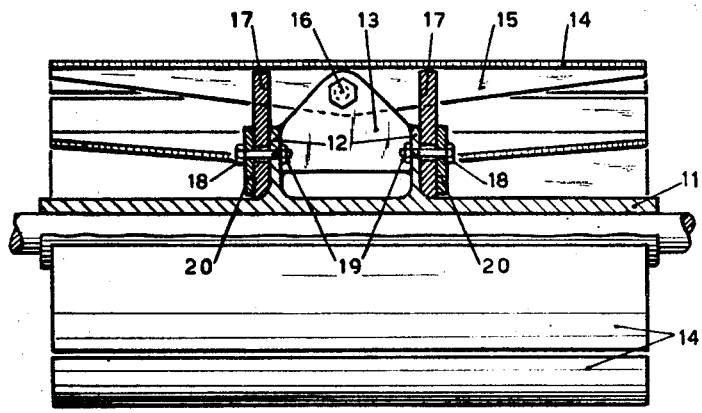
Fig. 3 is a longitudinal section, and in part an elevational view, of the second embodiment of my end roller, taken on line III—III of Fig. 4.
Figure 4:
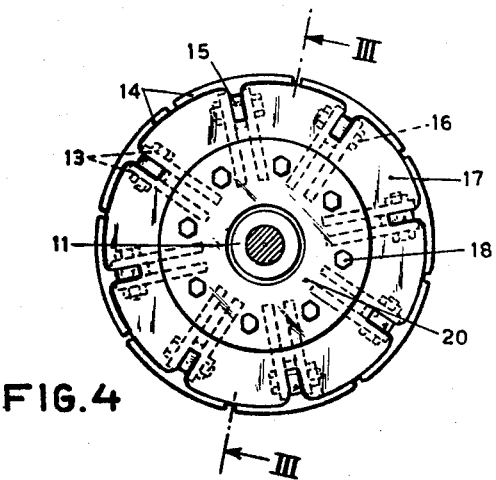
Fig. 4 is an end view of the second embodiment.

In the embodiment according to Figs. 3 and 4 the end roller comprises a hub 11 having two flanges 12, between which pairs of bridge pieces 13 are secured. Segmental outer members 14, which together form the outer belt-supporting surface of the roller, are provided with a longitudinal rib 15 having a hole for a bolt 16 by means of which each member 14 is pivotally mounted between a pair of bridge pieces 13. Rubber rings 17 are clamped between the flanges 12 and rings 20 by means of bolts 18 and nuts 19 and tend to keep the outer members 14 in a position parallel to the axis of rotation.

In general, the spaces between the outer members 14 and the other factors determining the maximum deviation of the outer members from the position parallel to the axis of rotation will be chosen so that these members are capable of converging at an angle of 10°.

Though the outer members are shown as being curved in the transverse direction only, they may also be curved longitudinally.

What I claim is:

1. An end roller for an endless belt, comprising a rotatable inner member, a plurality of segmental outer members curved in a plane transverse to the axis of said inner member and coaxially surrounding said inner member with small mutual separation in a manner forming a substantially cylindrical bearing surface therearound, fixed mounting means extending outwardly from said inner member and engaging said outer members substantially at their centers, said outer members being pivotally secured to said mounting means with freedom of limited swinging movement in respective axial planes, and transmission means for communicating a swinging movement of one of said outer members to at least one of the other outer members.

2. An end roller according to claim 1, further comprising resilient means tending to maintain said outer members generally parallel to the axis of said inner member, said resilient means comprising a pair of elastic rings surrounding said inner member on opposite sides of said mounting means.

3. An end roller according to claim 1 wherein said transmission means comprises inwardly facing camming formations on said outer members and an axially movable unit on said inner member co-operating with said camming formations for imparting similar pivotal displacements to each outer member in response to such displacement of one of said outer members.

4. An end roller according to claim 3 wherein each of said outer members is provided with an inwardly projecting longitudinal rib, said camming formations comprising sloping extremities on said rib.

5. An end roller for an endless belt, comprising a rotatable inner member, a plurality of segmental outer members curved in a plane transverse to the axis of said inner member and coaxially surrounding said inner member with small mutual separation in a manner forming a substantially cylindrical bearing surface therearound, fixed mounting means extending outwardly from said inner member and engaging said outer members substantially at their centers, said mounting means comprising an annular flange on said inner member, said outer members being pivotally secured to said mounting means with freedom of limited swinging movement in respective axial planes, and resilient means comprising a plurality of elastic supporting bodies positioned in a circular array adjacent the periphery of said flange, said resilient means tending to maintain said outer members generally parallel to the axis of said inner member, said outer members being anchored to said supporting bodies.

6. An end roller according to claim 5 wherein said supporting bodies are elongated and extend from said flange in a direction parallel to the axis of said inner member.

7. An end roller according to claim 6, further comprising an annular disc rigidly interconnecting the free ends of said supporting bodies, said outer members engaging said supporting bodies substantially midway between said flange and said disc.

8. An end roller according to claim 7 wherein each of said supporting bodies has two enlarged extremities tapering toward a reduced midsection, said outer members being provided with inwardly directed fins having perforations traversed by said supporting bodies.

9. An end roller according to claim 5 wherein each of said outer members is anchored to a symmetrically positioned, angularly spaced pair of said supporting bodies.

References Cited in the file of this patent
UNITED STATES PATENTS

| | | |
|---|---|---|
| 2,262,325 | Kendall | Nov. 11, 1941 |
| 2,330,923 | Robins | Oct. 5, 1943 |
| 2,334,768 | Hlavaty | Nov. 23, 1943 |